US009185919B1

(12) United States Patent
Tafoya

(10) Patent No.: US 9,185,919 B1
(45) Date of Patent: Nov. 17, 2015

(54) FISH HYDRO DESCALING APPARATUS

(71) Applicant: Thomas Tafoya, Key Largo, FL (US)

(72) Inventor: Thomas Tafoya, Key Largo, FL (US)

( * ) Notice: Subject to any disclaimer, the term of this patent is extended or adjusted under 35 U.S.C. 154(b) by 0 days.

(21) Appl. No.: 14/543,729

(22) Filed: Nov. 17, 2014

Related U.S. Application Data

(60) Provisional application No. 61/883,132, filed on Sep. 26, 2013.

(51) Int. Cl.
*A22C 25/02* (2006.01)
*A22C 25/00* (2006.01)

(52) U.S. Cl.
CPC .............. *A22C 25/025* (2013.01); *A22C 25/006* (2013.01)

(58) Field of Classification Search
USPC ............................................ 452/98, 105–105
See application file for complete search history.

(56) References Cited

U.S. PATENT DOCUMENTS 5,503,594 A * 4/1996 Karubian et al. ............. 452/173
5,607,349 A * 3/1997 Karubian et al. ............. 452/173

* cited by examiner

*Primary Examiner* — Richard Price, Jr.
(74) *Attorney, Agent, or Firm* — Lesley Ann Rhyne

(57) ABSTRACT

A fish descaling apparatus comprises a scaling member having a proximal end, a distal end and an aperture proximate the proximal end on a top surface thereon. The proximal end is removably coupled to a conduit connected with a conventional source of pressurized water and the distal end having a flat portion with a flange edge on at least one side thereof. A valve member is inserted within the aperture and adjusted to regulate the flow rate of water through the scaling member. In use, the flat portion with the flange edge facilitates descaling of the fish and the water runs through the scaling member simultaneously washes away the scales from the fish thereby facilitating efficient cleaning of the fish. In one embodiment, the apparatus comprises a plurality of stops that is adapted to collect and prevent the scales by moving towards the proximal end of the scaling member.

12 Claims, 6 Drawing Sheets

FISH HYDRO DESCALING APPARATUS

RELATED APPLICATIONS

This application is claiming priority benefit of earlier filed Provisional Patent Application No. 61/883,132 filed Sep. 26, 2013.

BACKGROUND OF THE DISCLOSURE

1. Technical Field of the Disclosure

The present embodiment relates in general to fish descalers. More specifically, the present disclosure relates to an improved fish descaling apparatus that is connected to a pressurized water source for cleaning a fish with water while simultaneously removing the scales from the fish.

2. Description of the Related Art

Descaling fish is a cleaning process in which the scales, dirt and grime on the fish are removed by continuously scraping using any of various scraping elements. During the process the scales and grimes are accumulated on the scraping element and hinder the process of cleaning. This requires a user to wash the scraping element with water to remove scales and grime from the fish and scraping element. Thus, the cleaning process is often an unpleasant, time consuming and messy operation. Various fish cleaning tools have been devised to scrape the scales from the fish.

Conventional standard scrubbers are an effective and quick way of literally scrubbing the scales off of the outside of a fish. These scrubbers are a balled up bundle of round stainless steel ribbons. However, the user needs to thoroughly rinse the scrubber to remove all of the scales and slime that will get embedded deeply into the scrubber and cause it to stink after few uses. Moreover, these scrubbers can harm the skin or flesh of the fish and fail to remove small scales.

Knives or knife-like implements can be used to scrape heavy scaled fishes from the tail to the head until the scales are removed. The fish are then rinsed with water to remove any remaining slime or scale pieces that are not embedded in the flesh of the fish. This can frequently cause injury to the hands of the user. Further, these implements are not able to effectively clean fish during the descaling process, nor reduce bacteria typically associated with the improper handling of the fish.

A conventional means for solving this problem is the use of fish scraping devices that include a handle and a scraping element connected to the handle, with the scraping element having a plurality of serrated teeth. The serrated teeth of the scraping element are used to remove the scales from the fish. However, the scales and grime tend to collect on the serrated teeth of the scraping element and the user needs to frequently at wash the scraping element. Moreover, the serrated teeth are difficult to guide properly along the surface of the fish for efficiently removing the scales without hannrming the flesh of the fish.

Many attempts have been made to incorporate a water spraying unit with the fish scraping devices. In use, the water flows through the passage in the handle and to the scraping element during a scraping process. However, the loosened scales become clogged between the laterally spaced serrated teeth which tends to block the flow of water when the teeth are pressed against the fish. Moreover, the scraping element is not ideally designed for easily accessing beneath the fish scales during descaling process.

Therefore, there is a need for an improved, lightweight and portable fish descaling apparatus that would provide efficient descaling of fish. Such an improved fish descaling apparatus requires less physical effort and creates less of a mess while cleaning the fish. Such a fish descaling apparatus would include a scaling member that is ideally designed for easily accessing beneath the fish scales. Such a needed device would be able to effectively clean fish while descaling thereby reducing the bacteria typically associated with the improper handling of the fish. Such a fish descaling apparatus would be connected to a pressurized water source for cleaning the fish with water while simultaneously removing the scales from the fish. Further, such a fish descaling apparatus would further includes a plurality of stops that is adapted to collect the scales and prevent the scales by moving towards the proximal end of the scaling member. Such a fish descaling apparatus would be adapted to remove the scales collected using the stops from the fish when the water is delivered through the scaling member in a rapid motion and stacked on the flat portion. Finally, this fish descaling apparatus would efficiently clear the loosened scales clogged onto the scaling member using the water that runs through it during the descaling process.

SUMMARY OF THE DISCLOSURE

To minimize the limitations found in the prior art, and to minimize other limitations that will be apparent upon the reading of the specifications, preferred embodiment of the present invention provides a fish descaling apparatus. The fish descaling apparatus comprises a scaling member having a proximal end, a distal end and an aperture that is positioned proximate the proximal end on a top surface of the scaling member. The proximal end is internally threaded and adaptable to couple with a conduit that allows water to pass therethrough. The distal end of the scaling member includes a flat portion with a flange edge on at least one side thereon. The fish descaling apparatus further includes a valve member that is inserted within the aperture on the top surface of the scaling member. The valve member is typically a ball valve. The valve member is snugly fit within the aperture of the scaling member utilizing a plurality of rubber O-rings, thereby preventing leakage of water leak.

The conduit is adapted to be connected with a conventional source of as pressurized water. The flat portion of the scaling member is designed for accessing beneath the scales of a fish, thereby descaling the fish easily. The flange edge of the flat portion allows the user to easily descale the fish having heavy, thin or thick scales. When the conduit is attached and turned on, the water runs from the conventional source of pressurized water through the conduit, valve member and out of the scaling member and simultaneously washes away the scales from the fish thereby facilitating efficient cleaning of the fish. The valve member is adjusted to regulate the flow rate of the water through the scaling member.

In one embodiment, the fish descaling apparatus comprises a plurality of stops that is positioned on the top surface of the scaling member proximate the flat portion. The plurality of stops is typically shark fin shaped stops. The plurality of stops is adapted to collect the scales and prevent the scales by moving towards the proximal end of the scaling member, thereby when the water is delivered through the flat portion the scales are washed away from the fish in a rapid motion and stacked on the flat portion. As the scales are stacked on the flat portion, the scales do not spread throughout the scaling member and provides easy cleaning of the fish.

A first objective of the present invention is to provide a fish descaling apparatus that is small, portable and lightweight.

A second objective of the present invention is to provide a fish descaling apparatus that is connected to a pressurized water source for cleaning a fish with water while simultaneously removing the scales from the fish.

A third objective of the present invention is to provide a fish descaling apparatus that requires less physical effort and creates less of a mess while cleaning the fish.

A fourth objective of the present invention is to provide a fish descaling apparatus that includes a scaling member having a flat portion with a flange end is ideally designed for easily accessing beneath the fish scales.

A fifth objective of the present invention is to provide a fish descaling apparatus that is able to effectively clean fish while descaling thereby reducing the bacteria typically associated with the improper handling of the fish.

A sixth objective of the present invention is to provide a fish descaling apparatus that includes a plurality of stops that is adapted to collect the scales and prevent the scales by moving towards the proximal end of the scaling member.

Another objective of the present invention is to provide a fish descaling apparatus that is adapted to remove the scales collected using the stops from the fish when the water is delivered through the scaling member in a rapid motion and stacked on the flat portion.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
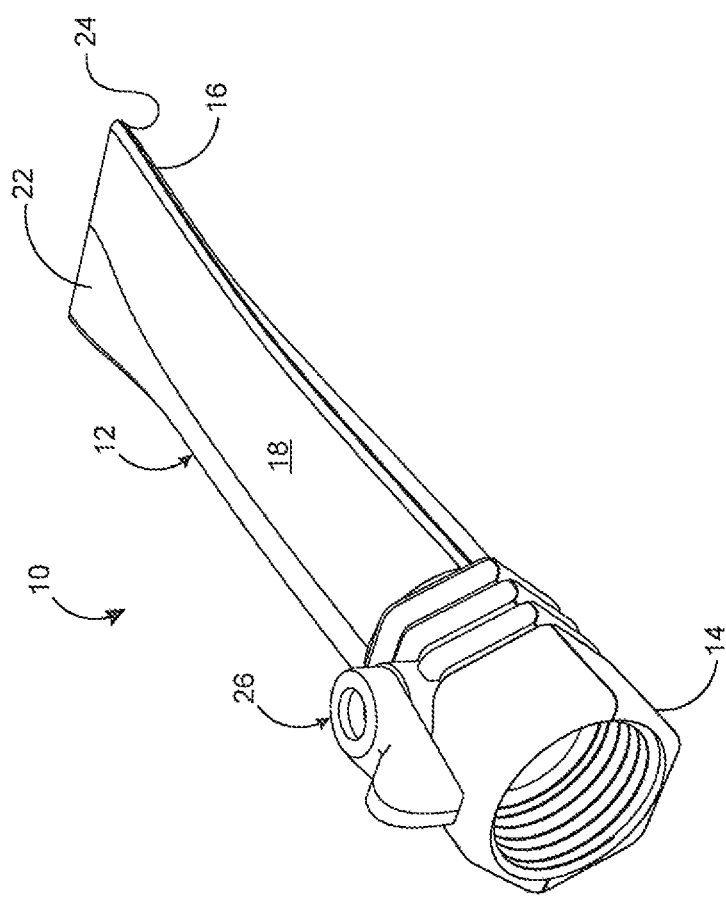
FIG. 1 illustrates a perspective view of a fish descaling apparatus in accordance with the preferred embodiment of the present invention.
Figure 2:
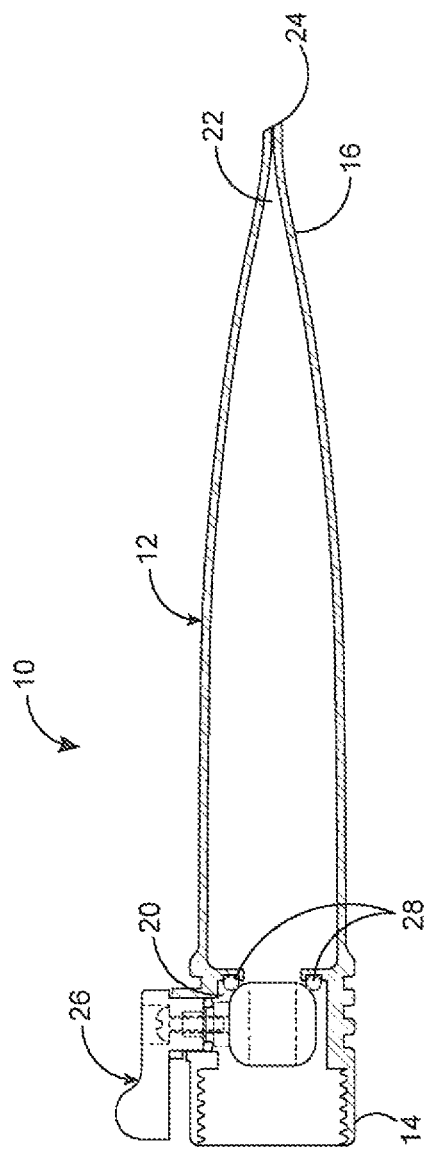
FIG. 2 illustrates a length-wise cross sectional view of the fish descaling apparatus shown in FIG. 1.

Turning first to FIGS. 1 and 2, different views of a fish descaling apparatus in accordance with the preferred embodiment of the present invention are illustrated. The fish descaling apparatus 10 comprises a scaling member 12 having a proximal end 14, a distal end 16 and an aperture 20 that is positioned proximate the proximal end 14 on a top surface 18 of the scaling member 12. The proximal end 14 is internally threaded and adaptable to couple with a conduit 30 (See FIG. 3) that allows water to pass therethrough. The distal end 16 of the scaling member 12 includes a flat portion 22 with a flange edge 24 on at least one side thereon. Preferably, the scaling member 12 is made of an integral one-piece metallic tube, such as for example steel, galvanized steel or stainless steel. Alternatively, the scaling member 12 may be constructed from materials having corresponding or similar properties. Further, the scaling member 12 may be sized and contoured dependent upon the needs and desires of a user.

The fish descaling apparatus 10 further includes a valve member 26 that is inserted within the aperture 20 on the top surface 18 of the scaling member 12 as shown in FIG. 2. The valve member 26 is typically a ball valve. The valve member 26 is snugly fit within the aperture 20 of the scaling member 12 utilizing a plurality of rubber O-rings 28. Additionally, epoxy or other similar materials may be used to make the valve member 26 air tight with the scaling member 12 so that the water flows through the conduit 30 (See FIG. 3), scaling member 12, flat portion 22 and out the flange edge 24 without allowing any water leak from the aperture 20 of the scaling member 12.

Figure 3:
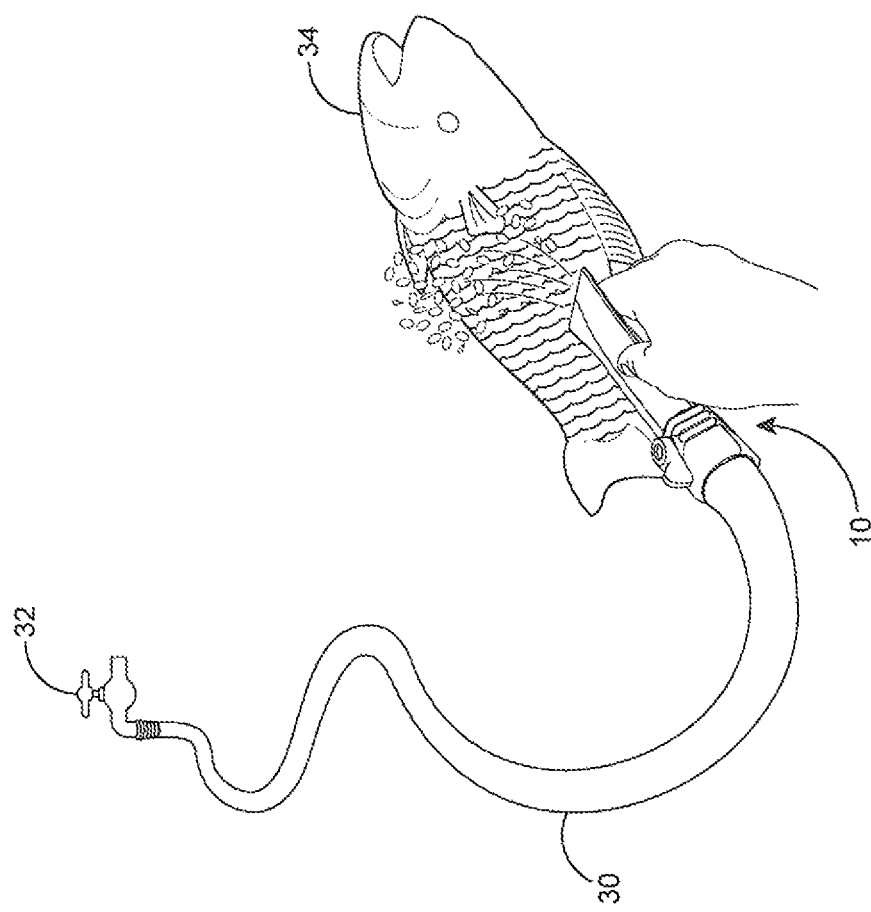
FIG. 3 illustrates a perspective view of the preferred embodiment shown in FIG. 1, in use.

FIG. 3 illustrates a perspective view of the preferred embodiment shown in FIG. 1, in use. The conduit 30 is adapted to be connected with a conventional source of pressurized water 32. The flat portion 22 of the scaling member 12 is designed for accessing beneath the scales of a fish 34, thereby descaling the fish 34 easily. The flange edge 24 of the flat portion 22 allows the user to easily descale the fish 34 having heavy, thin or thick scales. Thus, the flange edge 24 provides efficient cleaning of the fish 34 by easily fitting or slipping beneath the scales of the fish 34 while avoiding loss of valuable meat of the fish 34. When the conduit 30 is attached and turned on as shown in FIG. 3, the water runs from the conventional source of pressurized water 32 through the conduit 30, valve member 26 and out of the scaling member 12 and simultaneously washes away the scales from the fish 34 thereby facilitating efficient cleaning of the fish 34. The valve member 26 is adjusted to regulate the flow rate of the water through the scaling member 12.

Figure 4:
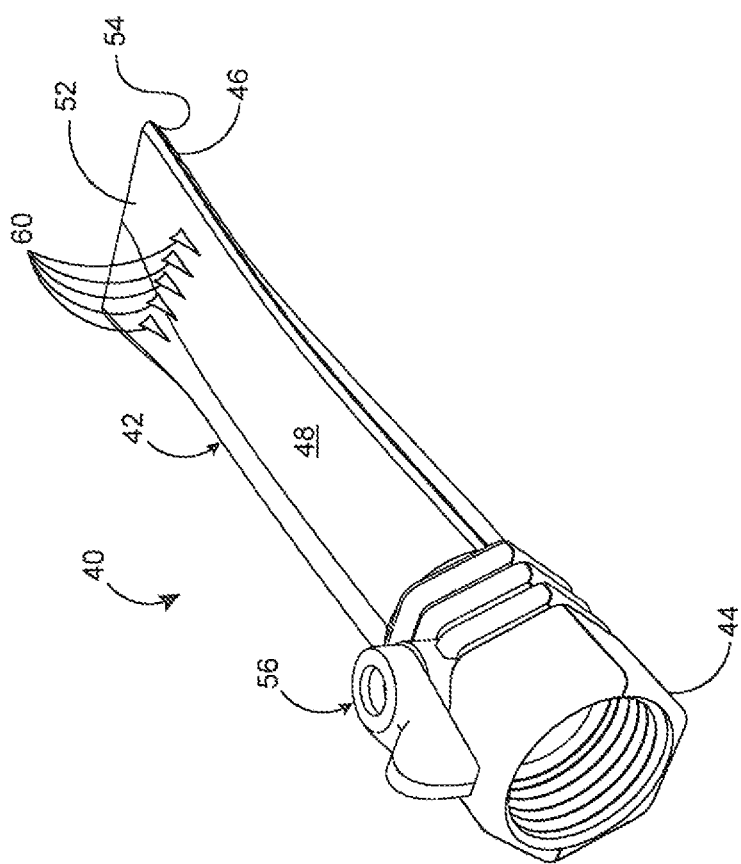
FIG. 4 illustrates a perspective view of another embodiment of the present invention shown in FIG. 1.
Figure 5:
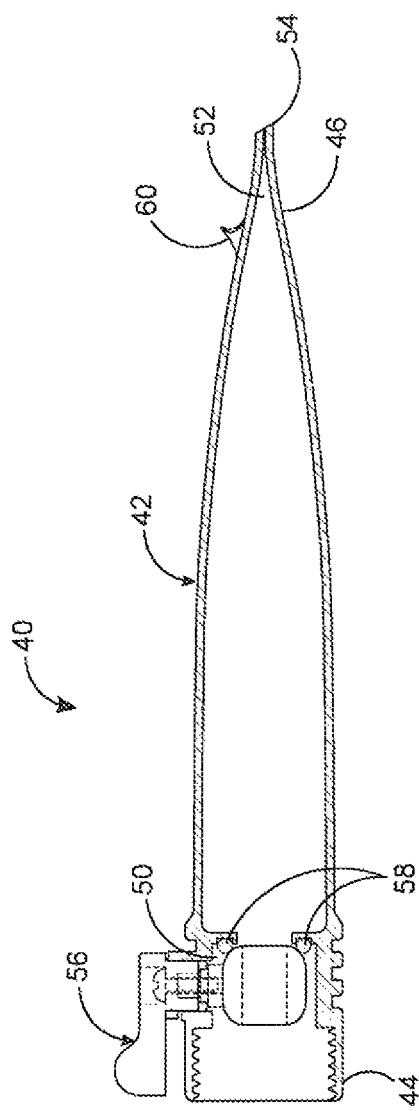
FIG. 5 illustrates a length-wise cross sectional view of embodiment shown in FIG. 4.

A fish descaling apparatus 40 in one embodiment illustrated in FIGS. 4 and 5 is similar structurally and functionally to the embodiment described in FIGS. 1 and 2, except further includes a plurality of stops 60. The fish descaling apparatus 40 comprises a scaling member 42 having a proximal end 44, a distal end 46 and an aperture 50 that is positioned proximate the proximal end 44 on a top surface 48 of the scaling member 42. Preferably, the scaling member 42 is made of an integral one-piece metallic tube, such as for example steel, galvanized steel or stainless steel. The proximal end 44 is internally threaded and adaptable to couple with a conduit 30 (See FIG. 6) that allows water to pass therethrough. The distal end 46 of the scaling member 42 includes a flat portion 52 with a flange edge 54 on at least one side thereon. The plurality of stops 60 is positioned on the top surface 48 of the scaling member 42 proximate the flat portion 52 as shown in this embodiment. The plurality of stops 60 is typically shark fin shaped stops. The fish descaling apparatus 40 further includes a valve member 56 that is inserted within the aperture 50 on the top surface 48 of the scaling member 42 as shown in FIG. 5. The valve member 56 is typically a ball valve. The valve member 56 is snugly fit within the aperture 50 of the scaling member 42 utilizing a plurality of rubber O-rings 58.

Figure 6:
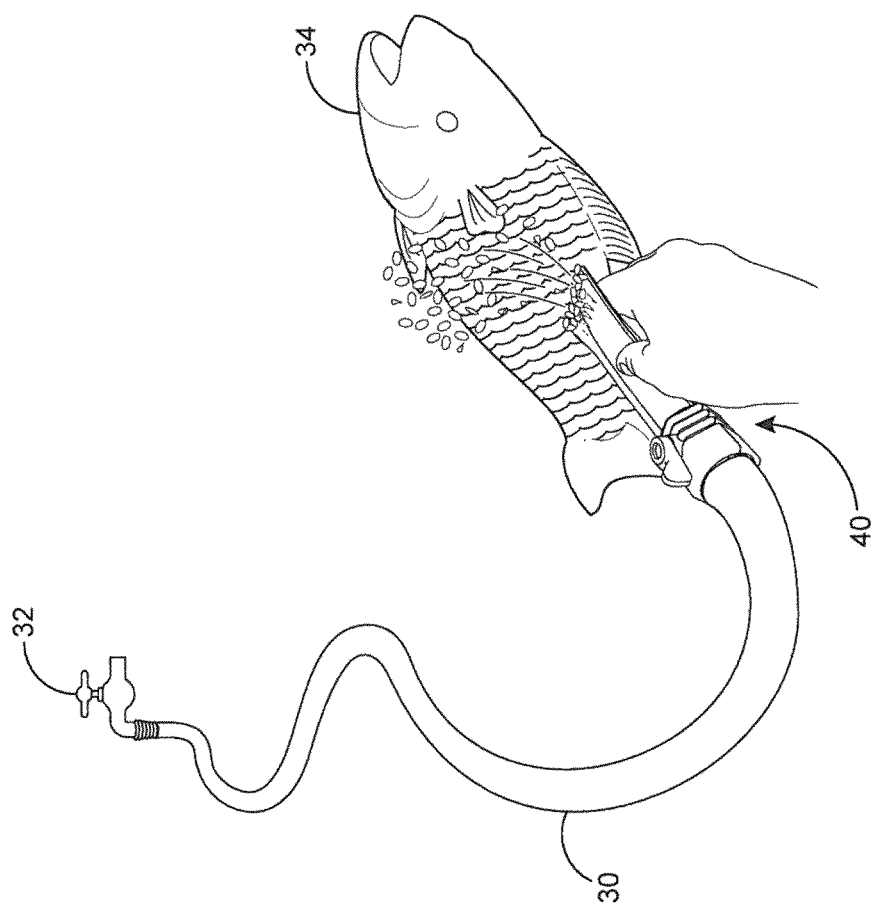
FIG. 6 illustrates a perspective view of another embodiment shown in FIG. 4, in use.

FIG. 6 illustrates a perspective view of another embodiment shown in FIG. 4, in use. The conduit 30 is adapted to be connected with a conventional source of pressurized water 32. The valve member 56 is adjusted to regulate the flow rate of the water through the scaling member 42. The flat portion 52 of the scaling member 42 is designed for accessing beneath the scales of a fish 34, thereby descaling the fish 34 easily. The plurality of stops 60 is attached to the top surface 48 of the scaling member 42 proximate the flat portion 52. As illustrated in FIG. 6, the plurality of stops 60 is adapted to collect the scales and prevent the scales by moving towards the proximal end 44 of the scaling member 42, thereby when the water is delivered through the flat portion 52 the scales are washed away from the fish 34 in a rapid motion and stacked on the flat portion 52. As the scales are stacked on the flat portion 52, the scales do not spread throughout the scaling member 42 and provides easy cleaning of the fish 34. The stacked up scales on the flat portion 52 may be disposed according to the discretion of the user after any number of scales and waste has stacked up.

The presently disclosed fish descaling apparatus 10 is advantageous because it is portable, lightweight and connected to any water source utilizing a conduit or garden hose by means of a standard plastic hose valve fitting. The fish descaling apparatus 10 requires only less physical effort and creates less of a mess while cleaning the fish 34. Further the fish descaling apparatus 10 is able to effectively clean fish while descaling thereby reducing the bacteria typically associated with the improper handling of the fish 34. Further, the fish descaling apparatus 10 preserves the valuable meat of the fish 34 while descaling and may be sized, contoured and constructed from materials with similar properties and dependent upon the needs and desires of the user.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A fish descaling apparatus comprising:
   a descaling member having a proximal end, a distal end and an aperture in the same plane, the proximal end being internally threaded to receive a conventional water hose; and
   a valve on an outside surface of the proximal end connected to a valve member inside the proximal end for adjusting amount of water flow through the proximal end;
   the elongated distal end includes a long flattened flanged wide narrow exit for the water received through the aperture from the proximal end; and
   at least one stop positioned on a top surface of the elongated distal end.

2. The fish descaling apparatus of claim 1 wherein the water hose is adapted to be connected with a conventional source of pressurized water.

3. The fish descaling apparatus of claim 1 wherein the valve member is a ball valve.

4. The fish descaling apparatus of claim 1 wherein the scaling member is formed of a three piece plastic tube.

5. The fish descaling apparatus of claim 1 wherein the wide flat portion having a long narrow exit for creating a knife like stream of water is designed for accessing beneath the fish scales, thereby descaling the fish easily.

6. The fish descaling apparatus of claim 1 further comprising a plurality of stops positioned proximate a flat portion on the top surface of the scaling member.

7. The fish descaling apparatus of claim 1 further includes a plurality of rubber O-rings that is adapted to snugly fit the valve member within the aperture of the scaling member, thereby preventing leakage of the water.

8. A fish descaling apparatus comprising:
   a scaling member formed of a plastic tube having in the same plane a proximal end, a distal end and an aperture proximate the proximal end on a top surface thereon, the proximal end being internally threaded and removably coupled to a conduit that allows water to pass there through and the distal end having a wide flat portion with a long narrow exit having a flange edge;
   a ball valve member inserted within the aperture being configured to control the flow rate of water through the scaling member; and
   a plurality of stops positioned on top of the flat portion.

9. The fish descaling apparatus of claim 8 wherein the conduit is adapted to be connected with a conventional source of pressurized water.

10. The fish descaling apparatus of claim 8 wherein the flat portion having a long narrow exit for creating a knife like stream of water is designed for accessing beneath the fish scales, thereby descaling the fish easily.

11. The fish descaling apparatus of claim 8 further comprising the plurality of stops having a curved shape.

12. The fish descaling apparatus of claim 8 further includes a plurality of rubber O-rings that is adapted to snugly fit the valve member within the aperture of the scaling member thereby preventing leakage of the water.

* * * * *